Patented Apr. 7, 1925.

1,532,858

UNITED STATES PATENT OFFICE.

RAYMOND F. BACON, OF PITTSBURGH, PENNSYLVANIA, ASSIGNOR, BY MESNE ASSIGNMENTS, TO THE FLEISCHMANN COMPANY, A CORPORATION OF OHIO.

MANUFACTURE OF YEAST.

No Drawing.      Application filed July 31, 1919. Serial No. 314,564.

*To all whom it may concern:*

Be it known that I, RAYMOND F. BACON, a citizen of the United States, residing at Pittsburgh, in the county of Allegheny and State of Pennsylvania, have invented certain new and useful Improvements in the Manufacture of Yeast, of which the following is a specification.

This invention relates to the manufacture of yeast, and has for its object the provision of a novel fermentable material having such qualities that it can be used on an extensive scale for the profitable production of yeast in large quantities.

In the earlier practice yeast has generally been manufactured by introducing seed yeast into a wort, the entirety of which was obtained by first saccharifying large masses of cereals (of the maize, rye, barley and wheat class); then acidifying and filtering the material and conducting it to the fermenters where the seed yeast is introduced and the culture is carried on. The aim has merely been to produce a fluid mass containing saccharine bodies, nitrogenous materials and mineral salts, respectively, of such characters that they are available, to some extent at least, for stimulating the multiplication of yeast cells and for furnishing material for cell structure. And it has been customarily assumed that it was merely necessary to have some carbohydrates, proteids and salts present, in certain amounts, to meet the demands of the yeast, and that the maximum possibility of yeast production would be reached.

Many disadvantages are incident to this older method when followed in the manufacture of yeast in large quantities. Extensive apparatus of an expensive sort is necessary. Long periods of time are required to produce the nutrient material and thereafter effect the production of the yeast.

It has long been regarded, however, as desirable to discover a composition which could be artificially formed, synthetically, by simply mingling together ingredients which would meet the requirements of yeast culture. Such synthetic formation of the nutrient masses would obviate the necessity of extensive plants and complicated and expensive apparatus, and the time required in manufacture would be greatly reduced. And numerous compositions and various component materials have been suggested, and many methods for artificially compounding them synthetically have been proposed. For example, a composition comprising an ammonium salt, cane sugar and mineral salts, in various proportions, has been suggested. But it was established when attempting to manufacture yeast on a large commercial scale that the yield was very low from such compositions relative to that which, theoretically, they should produce. It was found that some of the materials (such as the sugar materials in the nutrient masses) must be modified; and the yield of yeast is now known to be greater where, other things being equal, sugar materials, particularly reducing sugars of the glucose or maltose class, such as molasses, are used in place of cane sugar.

It has been observed that for some reason the whole of the possible nutrients in solution was not utilized in organic growth by the yeast. I have discovered, however, that if to an artificial nutrient solution of the kind referred to above, i. e., comprising sugar material, suitable nitrogenous substances and relatively small amounts of inorganic yeast nourishing salts there be added certain other materials which carry a relatively large portion of vitamine containing substances and which have been derived from a relatively inexpensive extraneous source, the nutrient solutions which heretofore were unprofitable can be made to propagate yeast with relatively large yields at comparatively small expense. The vitamine containing materials thus added augment the vitamines originally present in the nutrient solution and would be employed in amounts sufficient to utilize synthetic nutrient solutions of this type on a commercial scale.

There are numerous classes of extraneous vitamine-containing materials which possess relatively large quantities of the vitamine substance, and of these classes there are several typical bodies that can be specified, such as "rice polish", milk, green vegetable matter (such as grass), extract of yeast, etc. Rice "polish" is obtained in large quantities when rice is being hulled and polished when preparing it for food, and it contains an abundant quantity of the vitamin substances essential for the present purpose. The same substances are found in comparatively large quantities in the spent liquors finally escaping as waste after the fermentation caused by yeast or by other micro-organisms, and after the alcohol has been removed.

While meaning to include all of the materials possessing relatively large quantities of the vitamin substances (particularly all of those in the several classes typified by the bodies specified), I will herein, for sake of definiteness, largely refer to rice polish as a well defined and established type of the class of materials containing these substances.

The present invention will be clearly understood upon considering the following procedures, selected as examples, in the manufacture of yeast:

In a fermenting tank capable of holding, say, fifteen thousand (15,000) gallons of a fluid mass, are introduced four hundred (400) pounds of ammonium sulphate, sixty-five hundred (6500) pounds of molasses, and a comparatively large volume of water. There should also be introduced a small quantity of yeast nutrient inorganic salts, say fifty (50) pounds.

In the meantime, I have exposed five hundred (500) pounds, more or less, of rice polish to the action of one thousand (1,000) gallons, more or less, of water. They are thoroughly mixed and the mass allowed to stand for a few hours. After a period, preferably long enough to insure the extraction of the vitamin substances of the rice polish, the liquid is drawn off and filtered, if required, and then introduced into the mass above referred to in the fermenting tank. The total fluid mass in the fermenter will be one of about fourteen thousand (14,000) gallons.

Seed yeast in the usual proportion, three hundred (300) pounds, more or less, is then introduced and the process of yeast production is commenced; and with the required degree of aeration, the yeast production is carried on in the customary manner.

The effect of the addition of the vitamin substances to the nutrient is very marked. Under proper manipulation a composition such as above described (exclusive of the extract from the rice polish) should, under average conditions, produce a yield of from twenty-one hundred (2100) to twenty-eight hundred (2800) pounds of moist commercial yeast, but, with the vitamin substances added, will, under the same conditions, produce a yield from three thousand (3,000) to thirty-six hundred (3600) pounds; in the one case the yield being from thirty (30) to forty (40) percent of commercial yeast, while in the other case it is from forty-two (42) to fifty (50) percent.

Again, I have found that the initial mash mixture may comprise a small percentage of the saccharifiable cereals commonly used together with a relatively large quantity of sugar material, such as commercial molasses, and also an added amount of an ammonium salt. If the rice polish is introduced in its raw state it can be simultaneously subjected to the treatment which results in saccharifying the mash, and can thereafter be passed throgh the acidifying and filtering stages. Or in this case also, the vitamin extracts may be separately formed and introduced to the wort. And although the yield of yeast from a mixture, such as last specified (exclusive of the vitamin extracts) is materially enhanced because of the presence of the bodies resulting from saccharification, together with the ammonium salt and the molasses, in comparison with the amount of yeast that would result if an equivalency of cane sugar were employed, the presence of the vitamin extracts still further enhances the yield, and to a very marked extent.

Milk, skimmed or unskimmed, sweet or sour, I have found to be more or less largely charged with the vitamin substances of the character of those which I supply to the yeast. And as there are so many substances in the milk of which the yeast avails itself and as milk requires so little preparation, I generally introduce it directly into the fermenter. Whether the other ingredients are separately introduced into the fermenter and synthetically commingled or are brought there in the form of a wort derived from saccharification or similar treatment, a typical composition of this sort in the fermenter tank is as follows:

Fourteen thousand (14,000) gallons of water; four hundred (400) pounds of ammonium sulphate; sixty-five hundred (6500) pounds of molasses, small quantities of yeast nutrient inorganic salts, and one hundred (100) pounds of milk solids. Here the yield of yeast is remarkably high, it rising from twenty-one (21) to twenty-eight (28) hundred pounds up to three thousand (3000) to thirty-two hundred (3200) pounds when the procedure is carried on properly. While I am not at this time able to state in detail all the relations of causes and effects which are present, I have discovered that the abundant supply of vitamin substances is the main reason why the yeast organisms are powerfully stimulated in that they multiply rapidly and exhaust almost to the theoretical limit the possibilities of yeast cell multiplication, and is the cause of the production of a remarkably strong and durable cell structure.

Having described my invention, what I claim as new and desire to secure by Letters Patent is:—

1. In the art of yeast manufacture, the process of producing yeast which comprises preparing a yeast nutrient solution containing sugar material and yeast nourishing inorganic salts, propagating yeast therein with aeration, and adding extraneous vitamine-containing material, in amounts sufficient to produce high percentage yields of yeast relative to the amounts of sugar and salt nutrients employed.

2. In the art of yeast manufacture, the process of producing yeast which comprises preparing a yeast nutrient solution containing essentially molasses and yeast nourishing inorganic salts, propagating yeast therein with aeration, and augmenting the vitamines initially present by adding a predetermined amount of extraneous vitamine-containing material, whereby relatively high percentage yields from the nutrient materials employed are obtained.

3. In the art of manufacturing bakers' yeast, the process which comprises preparing a yeast nutrient solution containing molasses, and an ammonium salt, propagating yeast therein with aeration, and augmenting the vitamine substances originally present by adding a quantity of extraneous vitamine-containing material, whereby the yeast growth uses a relatively high percentage of the nutrients supplied, resulting in high yields of yeast.

In testimony whereof, I affix my signature.

RAYMOND F. BACON.